E. B. PHILLIPS.
VEHICLE SPRING.
APPLICATION FILED JAN. 15, 1916.
1,314,979.
Patented Sept. 2, 1919.
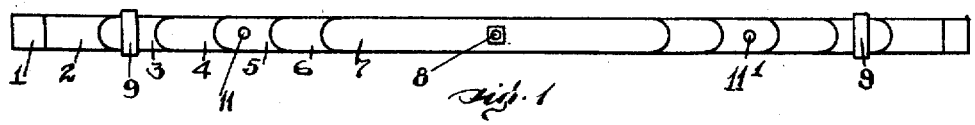
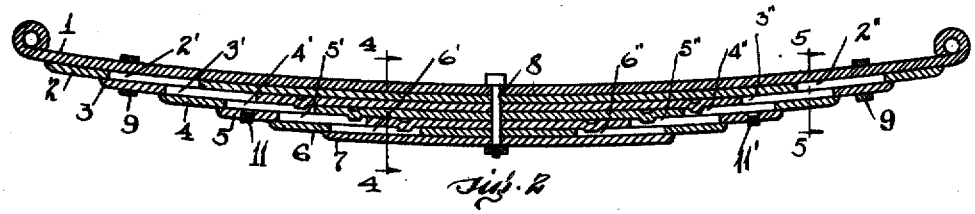
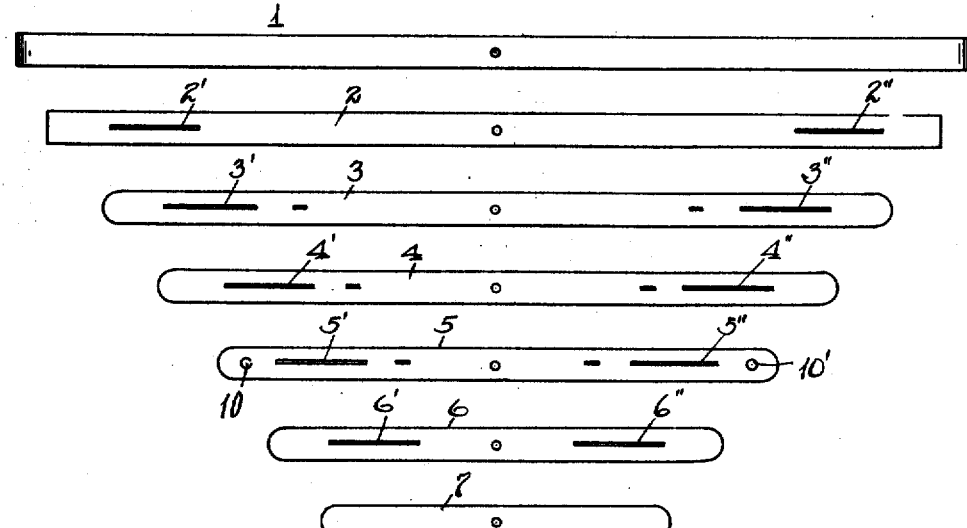
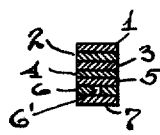
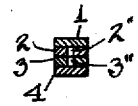
INVENTOR
Elbert B. Phillips
BY Tay, Oberlin & Tay
ATTORNEYS

UNITED STATES PATENT OFFICE.

ELBERT B. PHILLIPS, OF EUCLID, OHIO.

VEHICLE-SPRING.

1,314,979.  Specification of Letters Patent.  Patented Sept. 2, 1919.

Application filed January 15, 1916. Serial No. 72,225.

*To all whom it may concern:*

Be it known that I, ELBERT B. PHILLIPS, a citizen of the United States, and a resident of Euclid, county of Cuyahoga, and State of Ohio, have invented a new and useful Improvement in Vehicle-Springs, of which the following is a specification, the principle of the invention being herein explained and the best mode in which I have contemplated applying that principle, so as to distinguish it from other inventions.

The present improvements relate to a means for lubricating vehicle springs that are self-contained within the spring and which will operate automatically to provide a film of lubricant between the various leaves of the spring, with an avoidance of the faults that have prevented the adoption of previous devices aimed at the same result. To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawing:—

Figure 1 is a plan view of a spring; Fig. 2 is a longitudinal vertical section through a spring made in accordance with my invention; Fig. 3 is a plan view of the several leaves laid side by side; Fig. 4 is a transverse section on the line 4—4, Fig. 2; and Fig. 5 is a similar section on the line 5—5, Fig. 2.

It is obvious of course that springs will have greater flexibility if the leaves are lubricated, and hence lubricant, usually in the form of a mixture of graphite and grease, is applied to the leaves when they are first assembled. It is now recognized, however, that to secure the best results from the springs, some method must be employed for renewing this lubricant, either continuously or at stated intervals. Of course the springs may be taken down, but this is not usually practicable on account of the time and labor required, nor it is convenient to pry apart the leaves and spread the lubricant on the leaves when assembled. Several types of springs have accordingly been designed to permit of the supplying of lubricant to the contacting surfaces of the leaves from without. The best of these special springs involve the use of an internal chamber and an opening through some leaf to the chamber, and it is to this class of constructions that my invention belongs, it having been my object to provide an internal chamber of a size and shape that would neither excessively weaken the spring nor increase the cost of manufacture, and one that would nevertheless effectually lubricate those portions of the leaves having appreciable relative movement and therefore really requiring lubrication.

I accomplish the above mentioned desired results and escape the objections noted, by providing an internal chamber defined by a series of slots punched through the inner leaves and located where the greatest relative movement of the leaves occurs, *i. e.*, adjacent to the ends. When so located a relatively small chamber can be employed, and one that does not materially affect the strength of the spring.

In Figs. 1 and 2 there is shown a spring consisting of a plurality of leaves 1, 2, 3, 4, 5, 6 and 7, secured together by a bolt 8 and the leaves 1, 2 and 3 being held in position by clips 9. In such spring is an internal chamber for receiving lubricant formed by a series of alined overlapping slots 2', 3', 4', 5' and 6'. The individual slots are best seen in Fig. 3, being relatively short and narrow and so positioned that, when the leaves are assembled, they will overlap slightly in alinement thus defining a chamber corresponding approximately to the contour of the outside of the spring and positioned adjacent to the ends of the spring where the greatest relative movement occurs. In the other half of the spring I provide a second chamber by forming other slots 2", 3", 4", 5" and 6" defining a chamber similar in position and outline with that first described. The outer leaves 1 and 7 are imperforate, serving as a closure for the chambers formed in the spring. These two chambers are preferably not connected, in this way avoiding unnecessary weakening of the spring as would be the case in having one continuous lubricant chamber for the entire length of the spring.

Lubricant may be introduced into the chambers through openings 10 and 10' in the intermediate leaves which are normally closed by screw plugs 11 and 11'. These openings are preferably disposed so as to permit the lubricant to be supplied to approximately the center of the chambers.

On the leaves 3, 4 and 5 are formed beads 12 commonly used to register in complementary recesses in the adjacent leaves to maintain those leaves, not in the clips 9, in alinement. In my construction these beads are positioned to register in the slots (see Fig. 2), thus avoiding the use of any other recesses or apertures for them, while the size of the beads is insufficient to obstruct the passage of lubricant from one part of the chamber to another.

The nature of my invention is clear from the foregoing description, and its advantages are obvious to those familiar with spring lubrication. Very little metal is removed from the leaves but a sufficient chamber is formed to hold a considerable amount of lubricant in position to most effectively lubricate the leaves, i. e., over that portion of the surfaces where the greatest movement occurs.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

A spring comprising a plurality of superimposed leaves, the intermediate leaves being provided with narrow and relatively short longitudinally disposed slots extending through the leaves in alinement, such slots overlapping for a considerable portion of their length and defining a closed chamber approximately conforming to the contour of the exterior of the spring, such chamber being narrow, but relatively unrestricted from end to end.

Signed by me, this 13th day of January, 1916.

ELBERT B. PHILLIPS.

Attested by—
H. B. Fay,
D. T. Davies.

Copies of this patent may be obtained for five cents each, by addressing the "Commissioner of Patents, Washington, D. C."